(12) United States Patent
Berg

(10) Patent No.: US 8,881,487 B2
(45) Date of Patent: Nov. 11, 2014

(54) JOINING SYSTEM ARRANGEMENT FOR BUILDING ELEMENTS

(75) Inventor: Svein Berg, Isfjorden (NO)

(73) Assignee: Svein Berg Holding AS, Åndalsnes (NO)

( * ) Notice: Subject to any disclaimer, the term of this patent is extended or adjusted under 35 U.S.C. 154(b) by 0 days.

(21) Appl. No.: 13/995,826

(22) PCT Filed: Nov. 6, 2011

(86) PCT No.: PCT/EP2011/069488
§ 371 (c)(1),
(2), (4) Date: Jun. 19, 2013

(87) PCT Pub. No.: WO2012/084327
PCT Pub. Date: Jun. 28, 2012

(65) Prior Publication Data
US 2013/0298495 A1    Nov. 14, 2013

(30) Foreign Application Priority Data
Dec. 21, 2010    (NO) .................................... 20101785

(51) Int. Cl.
*E04B 1/38*    (2006.01)
(52) U.S. Cl.
USPC ............ 52/706; 52/333; 52/250; 52/707; 403/263; 403/264
(58) Field of Classification Search
USPC .......... 52/706, 253, 702, 707, 250, 252, 701, 52/703, 327, 333, 704, 585.1; 403/232.1, 403/187, 230, 264, 263
See application file for complete search history.

(56) References Cited

U.S. PATENT DOCUMENTS

| 1,510,518 A | | 10/1924 | White | |
|---|---|---|---|---|
| 3,733,757 A | * | 5/1973 | Scott | ............................... 52/105 |
| 4,903,448 A | * | 2/1990 | Compton | ........................ 52/252 |

(Continued)

FOREIGN PATENT DOCUMENTS

| DE | 19952594 A1 | * | 5/2001 |
|---|---|---|---|
| EP | 1 903 156 A2 | | 3/2008 |

(Continued)

OTHER PUBLICATIONS

International Seach Report issued in PCT/EP2011/069488 mailed Jun. 11, 2012 (3 pages).

(Continued)

*Primary Examiner* — Robert Canfield
*Assistant Examiner* — Babajide Demuren
(74) *Attorney, Agent, or Firm* — Osha Liang LLP

(57) ABSTRACT

A joining system arrangement for building elements the joining system arrangement having a box element adapted for embedment in a first building element, such that an open side of the box element is flush with a surface of the building element, and arranged such that a bridge element can be inserted into the box element, the box element having four side faces arranged around an open side and a back plate, wherein, at at least one side face of the box element includes at least one load transmitting element which is arranged externally on the at least one side face, the at least one load transmitting element configured such that at least two surface portions are formed, constituting a rounded face, which are turned away from the at least one side face of the box element and from each other.

14 Claims, 3 Drawing Sheets

(56) References Cited

U.S. PATENT DOCUMENTS

| | | | |
|---|---|---|---|
| 4,982,537 A * | 1/1991 | Matikainen | 52/251 |
| 5,862,634 A * | 1/1999 | Berger et al. | 52/73 |
| 6,679,017 B2 * | 1/2004 | Woodruff et al. | 52/283 |
| 7,520,101 B2 | 4/2009 | Berg et al. | |
| 7,818,933 B2 | 10/2010 | Berg | |
| 7,818,977 B2 | 10/2010 | Retolaza et al. | |
| 2004/0050012 A1 * | 3/2004 | Pulkkanen et al. | 52/702 |
| 2006/0239764 A1 | 10/2006 | Salman | |
| 2008/0027620 A1 | 1/2008 | Feuerlinger et al. | |
| 2008/0027920 A1 | 1/2008 | Schipunov et al. | |
| 2008/0279620 A1 | 11/2008 | Berg | |
| 2010/0313518 A1 * | 12/2010 | Berg | 52/707 |
| 2012/0089913 A1 | 4/2012 | Nam | |

FOREIGN PATENT DOCUMENTS

| | | | |
|---|---|---|---|
| GB | 1400595 A * | 10/1972 | |
| GB | 2226864 A * | 7/1990 | |
| NO | 316180 B1 | 12/2003 | |
| NO | 321443 B1 | 1/2006 | |
| NO | 323943 B1 | 4/2007 | |
| WO | 2009/030940 A2 | 3/2009 | |
| WO | 2009/067018 A2 | 5/2009 | |
| WO | 2010/019044 A2 | 2/2010 | |

OTHER PUBLICATIONS

Written Opinion issued in PCT/EP2011/069488 mailed Jun. 11, 2012 (6 pages).
International Preliminary Report on Patentability issued in PCT/EP2011/069488 dated Mar. 8, 2013 (10 pages).
Norwegian Search Report issued in Norwegian Application No. 2010785 dated Jul. 1, 2011 (6 pages).
Office Action issued in counterpart European Patent Application No. 11 778 906.5 dated Aug. 19, 2014 (4 pages).

* cited by examiner

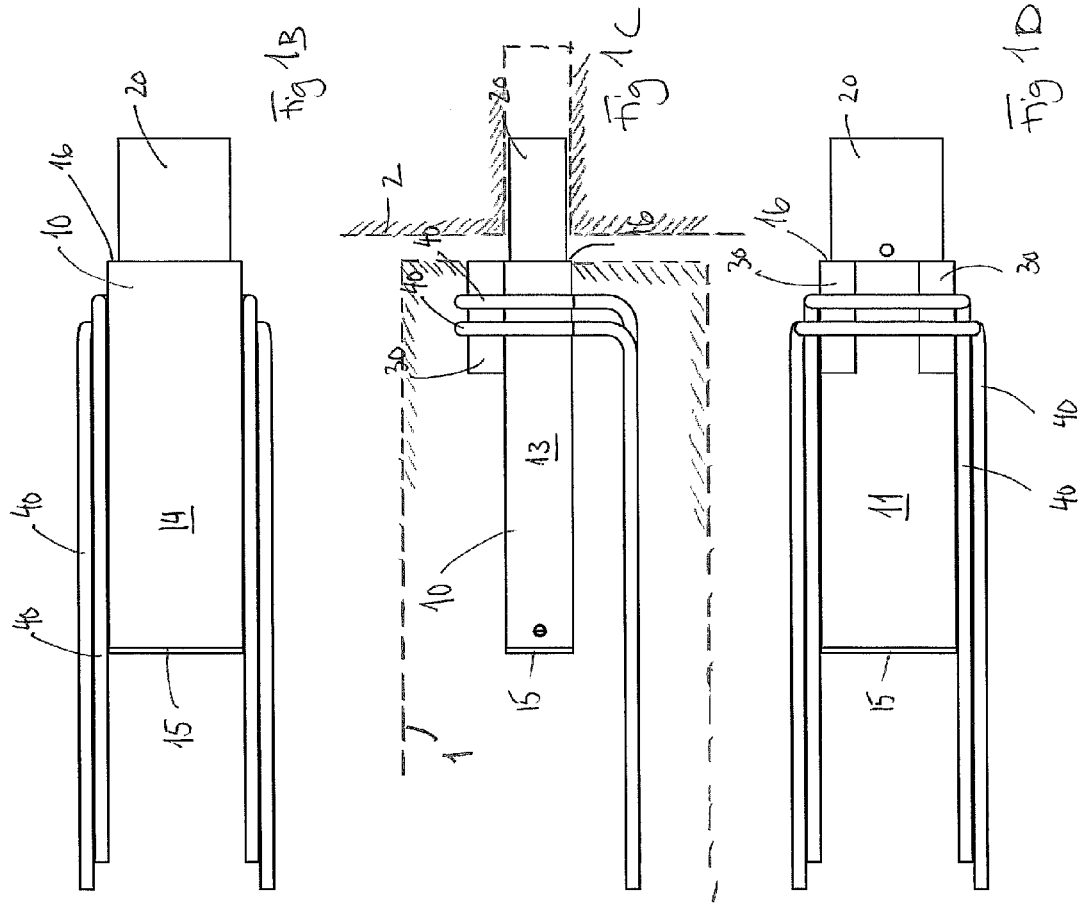
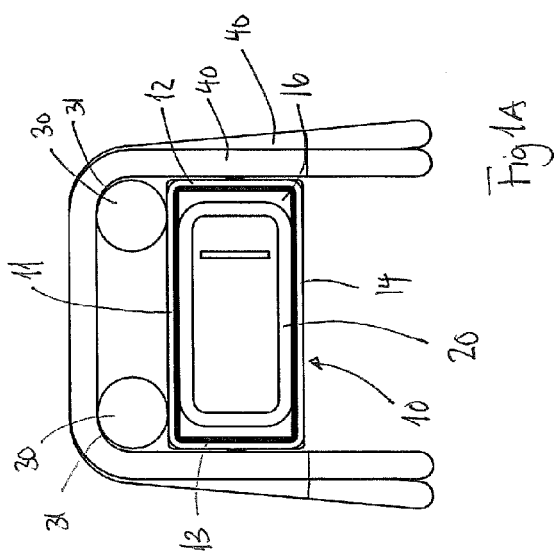

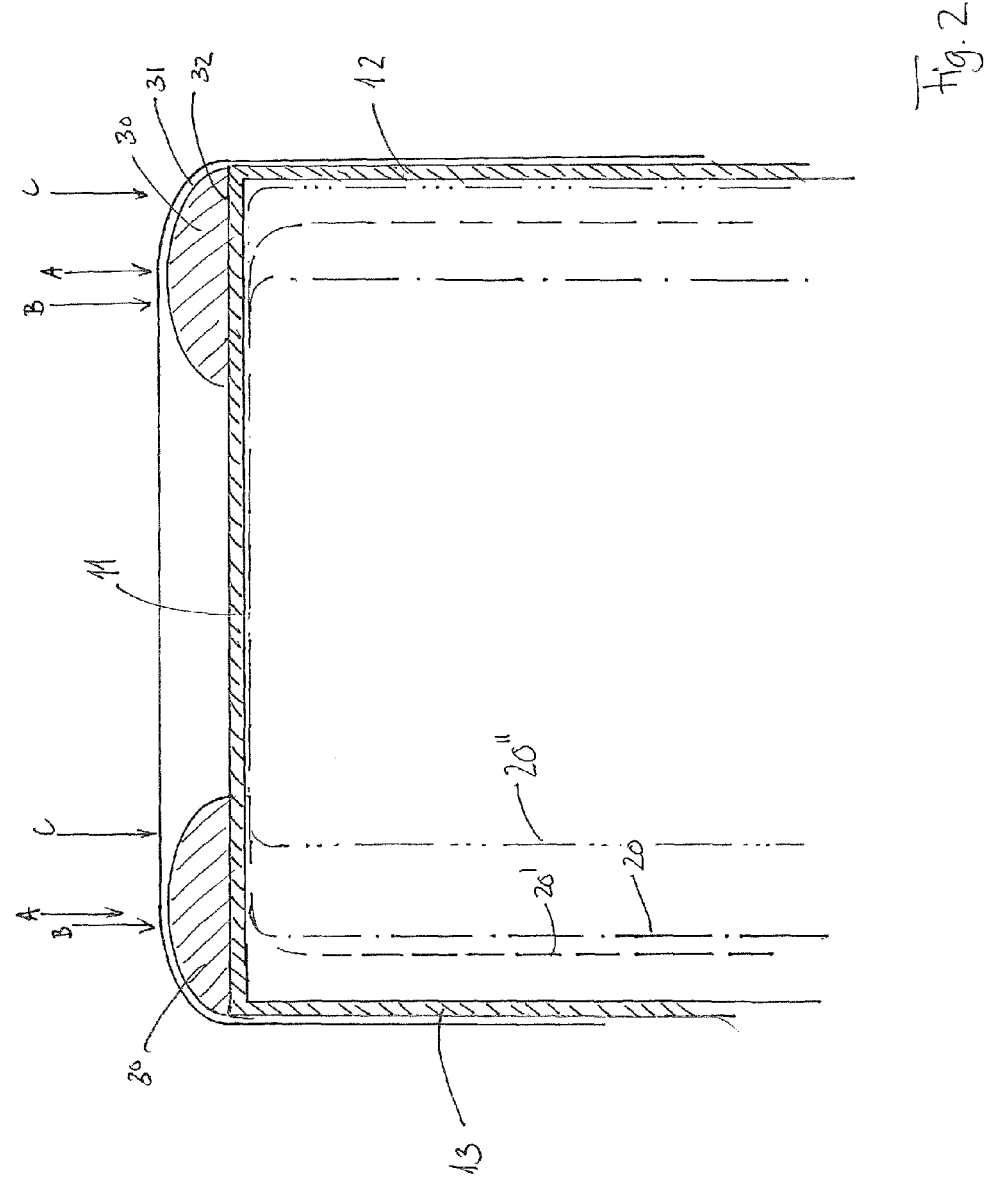

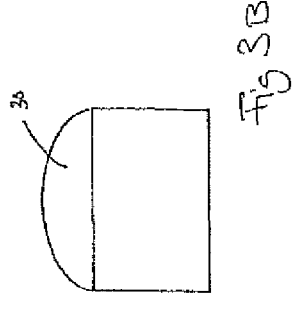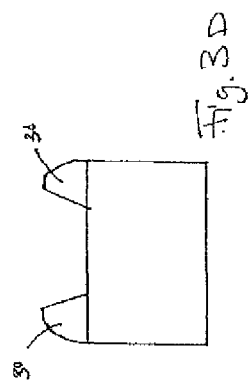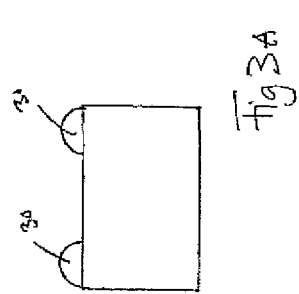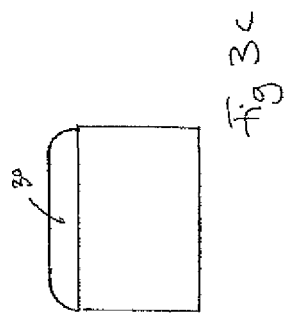

JOINING SYSTEM ARRANGEMENT FOR BUILDING ELEMENTS

CROSS-REFERENCE TO RELATED APPLICATIONS

This application is a National Stage application of International Patent Application No. PCT/EP2011/069488, filed on Nov. 6, 2011, which claims priority pursuant to 35 U.S.C. §119(a) to Norwegian Patent Application No. 20101785, filed on Dec. 21, 2010. The priority applications are hereby incorporated by reference in their entirety.

The present invention relates to a joining system arrangement for building elements.

Building elements such as columns and beams, landings and stair enclosures, walls and balconies must all be joined together in order to erect a building. There are countless devices to enable these building elements to be joined and held together. One category of these joining systems consists of systems that are not visible once the building elements have been joined together. Such systems generally have a box element arranged in connection with one of the building elements, often embedded the building element. A bridge element is further provided in this box element. The bridge element will, in a joined position, be located partly inside the box element, and thus one of the building elements, and partly inside the other building element thereby joining the building elements together. In a variant of such systems, the box element and the bridge element may be arranged such that the bridge element is located essentially inside the box element and can be moved from this position into an engaging position in which it is in engagement with both building elements. This means that it is possible to have a very small clearing between the elements that are to be joined when they are brought together, as there are no large parts projecting from the elements that are to be joined. Such a system is described in, for example, NO 316180.

In joining systems of this kind there is a transfer of relatively large loads. These loads are transmitted via the bridge element between the building elements and from the bridge element into the box element and thence into the building element also via reinforcement that is placed around the box element when it is embedded into the building element. In this connection, there are a couple of factors which affect the load transmission. Firstly, there is the cross-sectional form of the bridge element compared with the cross-sectional form of the box element. In some cases, the bridge element may have a width that is somewhat smaller than the width of the box element such that there is space between the bridge element and the box element. This further means that it is possible to obtain load transmission from the bridge element to the box element which is at a distance from the side edges of the box element. In the case where there is space between the bridge element and the box element, there is also uncertainty associated with how exact this load transition into the box element will be, since in such a case there can be no sideways displacement of the bridge element. Another factor is that there are normally reinforcing bars extending across the top side of the box element, down along the sides and then inwards into the building element. The box element is by nature relatively edged, and these edges will then bear against the reinforcing bars, which may be rather unfortunate as they might damage the reinforcing bar. The configurations of reinforcing bars and shape of the bridge element and box element might also result in the box element being deformed, which is also undesirable.

There is therefore a desire to provide a joining system in which these undesirable features are eliminated or reduced.

This is achieved by means of a joining system arrangement as disclosed in the following claims.

A joining system arrangement for building elements is provided. The building elements that are to be joined may be a column and a beam, a stair enclosure and a stair unit, a balcony and a wall or column or other building elements. The arrangement according to the invention will be capable of being arranged in any of these elements. The arrangement according to the invention, when used, is preferably embedded in a building element. The joining system comprises a box element adapted for embedment in a first building element, such that an open side of the box element lies flush with a surface of the building element. This open side of the box element will then, in use, be faced towards the second building element to which the first building element is to be fixed. Furthermore, the box element according to the invention is adapted such that a bridge element can be inserted into the box element. The bridge element may be of a type that can be moved between a fully retracted position inside the box element, where none or only small parts of the bridge element project outside the box element, and a position in which it is able to cooperate with both building elements for the interconnection thereof. Final interconnection of the building elements will also normally involve grouting of the space between the building elements after they have been connected using a joining system according to the invention. The box element in the joining system comprises four side faces arranged around the open side and a back plate. It is an essentially closed box element, such that it can be embedded in the building element without the internal space in the box element being filled during the concreting. There may be more openings that the open side, but any other openings will then be so configured than they keep the internal space from being filled during the concreting of the building element.

According to the invention, the joining system further comprises at at least one side face of a box element, at least one load transmitting element, which is so configured that at least two surface portions are formed, constituting a rounded face, which are turned away from the side face of the box element and from each other. In normal use, such a side face provided with load transmitting elements will be directed upwards, but other orientations are also conceivable.

The box element according to the invention has four side faces, which surround the open side. The side faces have a width which extends between the edges that are secured to adjacent side faces, and furthermore the side faces have a length which extends from the open side to a back plate. The back plate is arranged at an opposite side of the box element in relation to the open side. The side faces also have a thickness, which is the plate thickness of the side faces, and the distance between an interior surface of the side face and an exterior surface of the side face.

By reinforcing the side face of the box element with the load transmitting element, it is ensured that the load transmission from the bridge element, independent of its lateral position in the box element, is passed via the load transmitting element and then out into any reinforcement in the building element. Having two surface portions with a rounded face also provides the combination of box element and load transmitting element with a curved edge portion, which will mean that the reinforcement can quite easily be placed in abutment against the load transmitting element without the reinforcement being damaged. This will mean better load transmission from bridge element to building element has been obtained, and that it has also been obtained in such a way that unnecessary deformation of the box element is prevented.

According to an aspect of the invention, two load transmitting elements may be arranged at a side face of the box element, positioned close to opposite edges of the side face. Each of these load transmitting elements will in such a configuration form their respective rounded surface portion turned away from each other and away from the side face. The load transmitting elements may in this alternative cover the side face from the edge thereof widthways towards the centre of the side faces. Preferably, the two load transmitting elements exhibit symmetry, but a variant is also conceivable where there is no symmetry. The load transmitting elements may in such a case, for example, cover up to half the width of the side face. What is important here is that the load transmitting elements cover a width of the side face of the box element, which extends in from the edge of the box element, where this width is such that it covers a side edge of a bridge element arranged at least partly inside the box element, for the possible positions the bridge element may have when it is displaced sideways inside the box element. Alternatively, there may be a load transmitting element that extends across the whole width of the side face.

According to a further aspect, the load transmitting element(s) may extend from the open side of the box element lengthwise in across the side face of the box element. The load transmitting element(s), both in the case where there is only one or in the case where there are two arranged on a side face, may in an embodiment extend only some way inwards in the longitudinal direction of the side face from the open side of the box element. The load transmitting element may thus have an extent in the longitudinal direction of the side face which covers less than half the length of the side face. Alternatively, it can extend across more than half the length of the side face.

According to another aspect of the invention in the case with two load transmitting elements arranged at a side face of the box element, the load transmitting elements may be formed of elements that have an essentially round cross-section. As an alternative, they may have a cross-section corresponding to a semi-circle, or alternatively a semi-ellipse. The curvature of the curved face in the cross-section of the load transmitting element which faces away from the box element and away from the second load transmitting element may have a curvature of constant radius, or a curvature of varying radius. It is also conceivable to have a cross-section that is essentially rectangular but where at least one of the edges of the rectangle is curved, this being the edge that faces away from the box element and away from the second load transmitting element.

According to an aspect, a centre line of a cross-section of the load transmitting element in a projection down onto the side face to which the load transmitting element is arranged, may be located at a distance from the edge of the side face.

According to a further aspect, the joining system comprises at least one reinforcing bar that extends across the width of the side face of the box element provided with the load transmitting element(s) and then across at least a part of the width of the adjacent side faces, after which the reinforcing bars bend off and extend in a longitudinal direction of the side faces and on into the building element. The reinforcing bars preferably extend across the whole width of the adjacent side faces and some way in the same direction before they bend off in a longitudinal direction of the side faces, and in a direction away from the open side of the box element.

During normal use, the side face provided with the load transmitting element(s) will be faced upwards and will form a substantially horizontal side face of the box element. However, other orientations are possible such that the invention is not limited to this orientation. Furthermore, the joining system may be configured with the load transmitting element(s) on two side faces or three or all side faces. The joining system may comprise box elements provided with load transmitting elements and reinforcing bars according to the invention in both building elements that are to be joined.

The invention will now be explained in more detail with reference to some non-limiting examples of the invention that are shown in the appended figures, wherein:

FIGS. 1A-D show a first embodiment of the invention seen from the open side looking in towards three side faces;

FIG. 2 shows some details of the invention; and

FIGS. 3A-D show different variants of one of the details.

FIGS. 1A-D show a first embodiment of the invention. The invention comprises a box element 10, which has four side faces 11, 12, 13, 14 arranged around an open side 16. On the opposite side of the side faces 11, 12, 13, 14 is arranged a back plate 15. The open side 16, the side faces 11, 12, 13, 14 and the back plate 15 form a box with an inner cavity. A bridge element 20 is arranged in this inner cavity for joining building elements. The box element will, as indicated in FIG. 1C, normally be embedded a building element 1 with the open side 16 flush with a surface of the building element 1. The bridge element 20 will, in a connected state of the joining system, project some way into the box element 10 and some way into another building element 2. Load transmission is thus obtained between the building elements 1 and 2 via the bridge element 20 and the box element 10. The side face 11 has a width that extends from an adjacent side face 12 to the other adjacent side face 13, and a length that extends from the open side 16 to the back plate 15 and a thickness from the interior of the box element 10 to the exterior of the side face 11. There are similar widths, lengths and thicknesses for the other side faces 12, 13, 14. The box element 10 is shown having a rectangular cross-section in FIG. 1A, which shows the invention seen from the open side 16. The box element 10 may also be squarer or have an opposite rectangular form.

The box element 10, according to the invention, has arranged on one of its side faces 11 two load transmitting elements 30. In the illustrated case, these load transmitting elements are two elements which in cross-section have a round shape, as shown in FIG. 1A. They are arranged at opposite edges of the side face 11, and have an extent that extends widthwise in across the side face 11. The load transmitting elements 30 have a surface that forms two surface portions 31 which are turned away from each other and turned away from the side face 11, which forms a curved face. In the illustrated case, the whole surface of the load transmitting elements 30 forms a curved face. The load transmitting elements 30 extend further lengthwise from the open side 16 of the box element 10 towards the back plate 15, as best seen in FIGS. 1C and 1D, which show the arrangement seen in the direction of two different side faces, side face 13 and 11, respectively, where the load transmitting elements 30 are arranged to the side face 11. FIG. 1B shows the arrangement seen from the side face 14 which is opposite the side face 11 to which the load transmitting elements 30 are arranged.

Furthermore, it can also be seen from these figures how reinforcing bars 40 can be installed or laid in connection with the box element 10. The reinforcing bars 40 extend across the whole width of the side face 11 provided with the load transmitting elements 30 and abut against the two surface portions 31 of the load transmitting elements 30. The reinforcing bars 40 are then bent and run in the width of the side faces 13, 12 that are adjacent to the side face 11 provided with the load transmitting elements 30, and some way in the same direction before they are bent off again into a longitudinal direction of the side faces 11, 12, 13, 14 and extend in this direction away from the open side 16, some way further than box element 10.

By arranging load transmitting element(s) to a side face 11 of box element 10, it will be possible to take up loads from bridge elements 20', 20" in a satisfactory manner, as indicated by the arrows B and C in FIG. 2, even if the bridge element is given different positions, as indicated by the broken lines 20', 20" internally in the box element. The box element 10 will also be able to take up loads from the bridge element 20 even when this has different sizes, as indicated by the broken lines 20, 20' and the arrows A and B. As can be seen from FIG. 2, the load transmitting elements 30 may also be formed having a cross-section of a semi-elliptical shape.

Further cross-sectional shapes of the load transmitting elements are shown in FIGS. 3A-3D. In FIG. 3A there are two elements with a semi-circular cross-section, in FIG. 3B one load transmitting element with a cross-section that is semi-elliptical, and in FIG. 3C, there is one element where two of the corners in a rectangle have been bent with a steady radius of curvature. In FIG. 3D there are two elements that form two surface portions with varying radius of curvature and where they otherwise have an essentially rhomboid shape in one cross-section when the curved surface portions are disregarded.

Different embodiments of the present invention have now been described, but a person of skill in the art will understand that alterations and modification could be made to the illustrated embodiments which are within the scope of the invention as defined in the following claims.

The invention claimed is:

1. A joining system arrangement for building elements, the joining system arrangement comprising:
    a box element adapted for embedment in a first building element, such that an open side of the box element is flush with a surface of the building element, and arranged such that a bridge element can be inserted into the box element, the box element comprising four side faces arranged around an open side and a back plate;
    at least two load transmitting elements arranged externally at opposite edges of one of the side faces of the box element, the at least two load transmitting elements having an external rounded face; and
    a reinforcing bar extending across the width of the side face of the box element provided with the at least two load transmitting elements, the reinforcing bar abutting against the external rounded faces of the at least two load transmitting elements such that loads are transmitted from the bridge element to the first building element through said at least two load transmitting elements and said reinforcing bar.

2. The joining system arrangement according to claim 1, wherein the load transmitting elements extend widthwise from the opposite edges and in a direction toward each other.

3. The joining system arrangement according to claim 1, wherein the load transmitting elements are formed of elements having substantially round cross-section.

4. The joining system arrangement according to claim 1, wherein a downward projection of a centre line of a cross-section of the load transmitting element onto the side face to which the load transmitting element is arranged, is located at a distance from the edge of the side face.

5. The joining system arrangement according to claim 1, wherein the joining system further comprises at least one reinforcing bar which extends across the width of the side face provided with the load transmitting element, and bends off and extends further across at least a part of a width of adjacent side faces, after which it bends off and extends in a longitudinal direction of the side faces in a direction away from the open side of the box element.

6. The joining system arrangement according to claim 1, wherein load transmitting elements extend from the open side of the box element and lengthwise across the side face of the box element.

7. The joining system arrangement according to claim 1, wherein the load transmitting elements extend widthwise from the opposite edges and in a direction towards each other.

8. The joining system arrangement according to claim 2, wherein the joining system further comprises at least one reinforcing bar which extends across the width of the side face provided with the load transmitting element, and bends off and extends further across at least a part of a width of adjacent side faces, after which bends off and extends in a longitudinal direction of the side faces in a direction away from the open side of the box element.

9. The joining system arrangement according to claim 3, wherein the joining system further comprises at least one reinforcing bar which extends across the width of the side face provided with the load transmitting element, and bends off and extends further across at least a part of a width of adjacent side faces, after which bends off and extends in a longitudinal direction of the side faces in a direction away from the open side of the box element.

10. The joining system arrangement according to claim 4, wherein the joining system further comprises at least one reinforcing bar which extends across the width of the side face provided with the load transmitting element, and bends off and extends further across at least a part of a width of adjacent side faces, after which bends off and extends in a longitudinal direction of the side faces in a direction away from the open side of the box element.

11. A joining system arrangement for building elements, the joining system arrangement comprising:
    a box element adapted for embedment in a first building element, such that an open side of the box element is flush with a surface of the building element, and arranged such that a bridge element can be inserted into the box element, the box element comprising four side faces arranged around an open side and a back plate;
    a load transmitting element which is arranged externally on one of the side faces of the box element, the load transmitting element extending across the width of the side face of the box element and having an external rounded face; and
    a reinforcing bar extending across the width of the side face of the box element provided with the load transmitting element, the reinforcing bar abutting against the rounded face of the at least one load transmitting element such that loads are transmitted from the bridge element to the first building element through said load transmitting element and said reinforcing bar.

12. The joining system arrangement according to claim 11, wherein the load transmitting elements are formed of elements having substantially round cross-section.

13. The joining system arrangement according to claim 11, wherein the at least one reinforcing bar bends off and extends further across at least a part of a width of adjacent side faces, after which it bends off and extends in a longitudinal direction of the side faces in a direction away from the open side of the box element.

14. The joining system arrangement according to claim 12, wherein the at least one reinforcing bar bends off and extends further across at least a part of a width of adjacent side faces, after which it bends off and extends in a longitudinal direction of the side faces in a direction away from the open side of the box element.

* * * * *